United States Patent [19]
Milamed

[11] 4,313,749
[45] Feb. 2, 1982

[54] METHOD FOR MAKING LIGHTWEIGHT MIRROR FACESHEETS

[75] Inventor: Robert L. Milamed, Swampscott, Mass.

[73] Assignee: Itek Corporation, Lexington, Mass.

[21] Appl. No.: 153,518

[22] Filed: May 27, 1980

[51] Int. Cl.³ .......................................... C03C 27/04
[52] U.S. Cl. ........................................ 65/43; 65/60.4; 65/60.7
[58] Field of Search ............... 65/43, 60 C, 60.4, 60.7

[56] References Cited

U.S. PATENT DOCUMENTS

| | | | |
|---|---|---|---|
| 2,139,431 | 12/1938 | Vatter | 65/43 X |
| 2,837,235 | 6/1958 | Vincent | 220/2.3 |
| 2,920,785 | 12/1960 | Veres | 220/2.3 |
| 3,186,743 | 6/1965 | Russell, Jr. | 285/238 |
| 3,202,493 | 8/1965 | Heil | 65/43 |
| 3,479,170 | 11/1969 | Louden | 65/59 |
| 3,507,737 | 4/1970 | Busdiecker et al. | 161/4 |
| 3,632,008 | 1/1972 | Lind | 65/43 X |
| 3,747,173 | 7/1973 | Lind | 29/472.7 |

FOREIGN PATENT DOCUMENTS

| | | | |
|---|---|---|---|
| 41-12331 | 11/1966 | Japan | 65/43 |
| 830328 | 3/1960 | United Kingdom | 65/43 |

*Primary Examiner*—Arthur D. Kellogg
*Attorney, Agent, or Firm*—Homer O. Blair; Robert L. Nathans; Gerald H. Glanzman

[57] ABSTRACT

A method for making lightweight mirrors. The method consists of metallizing a precise pattern onto the back surface of a mirror element so as to provide a surface to which stiffening ribs or other components, such as flexure components, may readily be soldered.

The method according to the present invention avoids the expense of conventional machining techniques and provides a better quality bond than is attainable by normal cementing. It also eliminates the risk of distortion and spoilage that is borne in fusing by firing to the softening point of the glass.

8 Claims, 5 Drawing Figures

METHOD FOR MAKING LIGHTWEIGHT MIRROR FACESHEETS

TECHNICAL FIELD

The present invention relates to the construction of mirrors, and, in particular, to a method for making lightweight glass mirrors and mirror assemblies by means of a titanium hydride or another metallizing process.

BACKGROUND ART

Large, lightweight mirrors are used in a variety of space applications, as well as in many other fields. In space activities, for example, it is important that the mirrors be as light in weight as possible, so as to lessen the payload that must be carried into space. Also, in adaptive optics fields wherein deformable mirrors are utilized, forces must be applied to thin sections of the mirror to deform it, and the less the weight of the mirror, the less the force that must be applied, and the smaller the force generators (actuators) and flexures that are required.

Nothwithstanding the desire for the mirror to be as light in weight as possible, it must, at the same time, have sufficient rigidity and stability so that it can be efficiently controlled and/or otherwise handled. It is taught in the prior art, for example, that the weight of a glass mirror can be reduced by simply forming a large number of cavities or pockets in the back face of the mirror support. This can be done by physically machining holes in the back surface of the mirror to create a honeycomb structure or the like, or alternatively, a very thin facesheet of ULE, fused silica, etc., can be used together with appropriate stiffening elements which are attached to it by cementing or by fusing to provide the needed support.

In the embodiment wherein the mirror is reduced in weight by machining, it is obvious that the time and expense involved in completing the mirror will be substantial. The use of epoxy to bond a facesheet to stiffening elements is also not a particularly desirable approach because it has been found that substantial cracking and chipping tends to appear in the glass at even carefully controlled fillets of epoxy, at the very low temperatures encountered in space. Also, tests have shown evidence of initial atmospheric moisture causing separation of epoxy bonded glass to glass joints during thermal cycling to very low temperatures. Fusing is also done by firing to the softening point of the glass, and therefore carries considerable risk of distortion and spoilage.

Thus, there is a real need for an improved method of making lightweight glass mirrors that will avoid the disadvantages described above.

DISCLOSURE OF THE INVENTION

In accordance with the present invention, a novel method of making lightweight glass mirrors is provided that offers significant advantages over the more conventional techniques described above. In accordance with the present invention, the method involves metallizing a precise pattern on the back surface of a thin mirror or mirror facesheet to provide a surface to which stiffening ribs or other support structure or interface parts can be joined by soldering. In accordance with a presently most preferred embodiment, the structure is soldered to the mirror simultaneously with the metallizing step, and, as will be explained hereafter, the resulting bond provided by this method has been found to be strong and stable.

Preferably, a titanium hydride metallizing process is employed in carrying out the present invention, and the specific details of this process will be set forth more completely hereinafter.

Significant advantages are provided by the present invention. Initially, the time and cost involved in manufacturing the mirror is substantially reduced as compared with the prior art machining procedures. Also, the cracking and chipping at very low temperatures that is encountered when cementing with epoxy is substantially eliminated. Further, the risk is removed of distortion and spoilage that takes place in fusing by firing to the softening point of the glass.

Yet further specific features and advantages of the invention will become apparent hereinafter in conjunction with the detailed description of the best mode for carrying out the invention.

BRIEF DESCRIPTION OF THE DRAWINGS

FIG. 3 illustrates a cross-sectional view of the facesheet of FIGS. 1 and 2 with stiffening ribs maintained in position by graphite blocks, FIG. 4 illustrates the back surface of the assembly of FIG. 3, and FIG. 5 illustrates a suitable clamping structure for clamping the assembly of FIGS. 3 and 4 in place during metallizing and soldering.

BEST MODE FOR CARRYING OUT THE INVENTION

Figure 1:
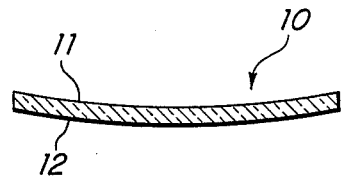
FIG. 1 schematically illustrates a cross-sectional view of a mirror facesheet before being stiffened in accordance with the teachings of the present invention.

FIG. 1 illustrates, in schematic cross-sectional view, a glass mirror facesheet 10 which is adapted to have stiffening structure or other appropriate elements joined to it in accordance with the present invention. Facesheet 10 may be used in a passive mirror system where it might have support structure which includes appropriate stiffening structure secured to it, or it may be adapted for use in an active system and have support structure which includes stiffening ribs as well as various flexure components secured to it. The present invention is intended to cover both applications although, for the most part, the following description will relate to the practice of the invention with respect to an active mirror system.

Facesheet 10 may be formed of ULE, fused silica or any one of several other suitable materials known in the art. Depending on its intended use, it may be as much as many square feet in size and as little as a fraction of an inch thick. It also may be flat or curved (as is the illustrated embodiment), and it may form a complete mirror in and of itself, or merely be a section of a much larger system.

The sheet 10 consists of a mirrored surface 11 and a back surface 12. It is to this back surface to which stiffening ribs or other elements are to be joined to the facesheet.

Figure 2:
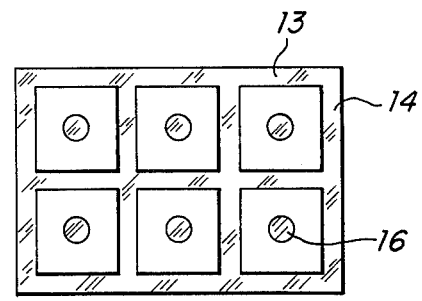
FIG. 2 illustrates the back surface of the facesheet of FIG. 1 with a metallized surface pattern applied thereto in accordance with the present invention.

In accordance with a preferred embodiment of the invention, the method includes employing a metallizing process to apply a precise metallized surface pattern onto the surface 12 to which stiffening ribs or other elements can be soldered. FIG. 2 illustrates a typical pattern that might be applied. As can be seen, this pattern consists of an array of horizontal and vertical lines 13 and 14, respectively, forming a plurality of square areas in the center of each of which is located a spot 16. Appropriate stiffening ribs are adapted to be soldered to the facesheet along the lines 13 and 14. Flexure elements or other components could conveniently be secured to the faceplate where the spots are illustrated. Obviously, any desired pattern could be applied depending on the particular application, and an important feature of the invention is that a very precise metallized pattern can be created depending on what is required.

The metallizing process employed is preferably a titanium hydride process, since this appears to provide the best results, however, other metallizing processes could also be used, and it is intended that the invention cover the use of these additional processes as well.

In the preferred process, an acrylic polymer reduced with toluene is added to titanium hydride powder as a binder to form a paste which can then be applied to the back surface 12 of the glass faceplate precisely where bonding is desired. The glass is then placed in a vacuum furnace and heated to about 650° C. At about 500° C., the titanium hydride breaks down into pure titanium and hydrogen gas. The titanium bonds chemically to the glass, thus providing the base for soldering. The peak temperature of 650° C. attained in the method, is considerably less than the softening points of either ULE or fused silica, which are 1,490° C. and 1,585° C., respectively.

In manufacturing active mirrors (by means other than machining), it is the usual practice to bond the facesheet to stiffening ribs of the same material (in fact, it is the combination of the mirror face and the stiffening ribs that are usually referred to as a "facesheet"). In such a situation, the appropriate surfaces of the elements making up the ribs would also be metallized with a thin layer of titanium in the same manner as the sheet. A thin strip of the appropriate solder would then be sandwiched between the two metallized surfaces and the elements soldered together, or alternatively, and more preferably, the metallizing step and the soldering step can be carried out simultaneously by adding a suitable solder between the two mating surfaces coated with titanium hydride/binder paste before heating in the furnace.

Figure 3:
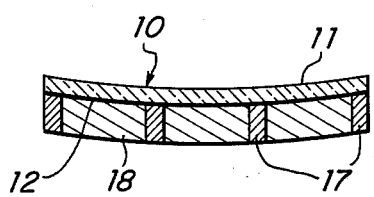
FIGS. 3–5 illustrate a preferred manner of securing stiffening ribs to the facesheet of FIGS. 1 and 2. Specifically.
Figure 4:
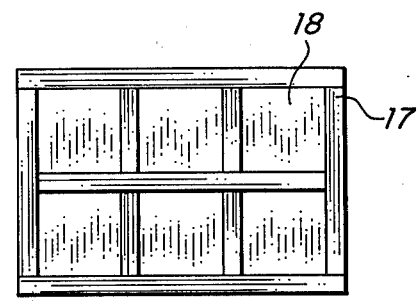
Figure 5:
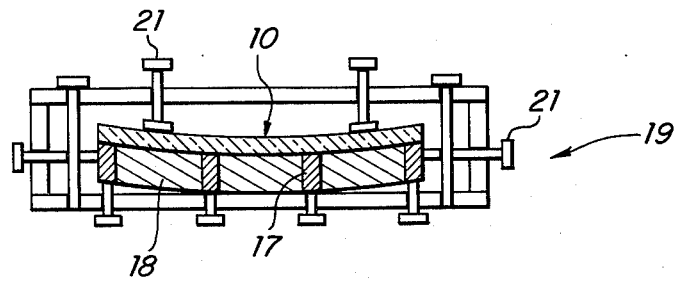

FIGS. 3–5 illustrate the procedure for completing the process. Specifically, FIG. 3 illustrates, in cross-sectional side view, the mirror faceplate 10 of FIGS. 1 and 2 with stiffening ribs 17 supported in position for soldering to the metallized areas 13 and 14 of plate 10 by means of graphite blocks 18 which are used to maintain the ribs in the proper position in the furnace. FIG. 4 illustrates a bottom view of the assembly of FIG. 3.

FIG. 5 illustrates a suitable clamping assembly 19 having a plurality of clamping elements 21 to hold everything in position in the furnace during the metallizing/soldering operation. When heated, the solder will flow only over the metallized areas, preventing the formation of fillets, as sometimes occurs in conventional cementing procedures.

After soldering, the clamping assembly is released, and the graphite blocks removed, and a properly stiffened facesheet is provided that is ready for figuring or whatever other procedures are desired.

If it is important for the support blocks to closely match the thermal expansion of the facesheet, blocks of the same material as the facesheet can be used.

It has been found that the strength and stability of the joint produced in accordance with the above general procedure is good. This is illustrated by the following examples.

EXAMPLES

Two test samples were made from scrap fused silica parts, a 1.62" square×0.09" wall tube to a 0.04" thick flat plate. Solder used for the first sample was 90% indium, 10% silver, while solder of 90% lead, 10% silver was employed for the second sample. Surfaces at the interface were ground flat to a #320 finish. A paste of titanium hydride powder and binder of acrylic polymer reduced with toluene was applied to the mating surfaces. The originally round wire solder was rolled flat to 0.002" wide and positioned between the mating surfaces. A 4 lb. weight was used to press the parts together during heating. Metallizing and soldering took place simultaneously. Bonds were achieved with both solders and the flowed solder had the bright look typical of a good soldered joint.

The samples were then gradually submerged in liquid nitrogen, and left submerged for three hours. Some chipping or separation at the interface is visible through the transparent side of the plate. Howdver, the bonds appear to be quite strong, notwithstanding that even with gradual submerging of the samples, they have been subjected to a severe thermal shock, more severe in fact, than would be expected in actual use.

In the samples that were made, a calculated nominal thickness of 0.0022 inch of pure titanium was applied to each of the mating fused silica surfaces. This was on the basis of 0.004±0.001 inch thickness of titanium hydride paste applied to each surface. It is believed that it would be possible to decrease the thickness of the titanium applied to the surfaces as well as the thickness of the solder itself (which was something less than the original 0.002 inch flat strip used).

Front surface stability with temperature increase over a 120° F. range was checked. There was a ¼ wave change in surface over the general area (not localized), considered good.

Various ways of fabricating the stiffening ribs have been considered. Typically, for example, these ribs might be 3 mm thick and one inch wide with a length as is required. They could be notched, if desired, to form a conventional egg crate lattice design. The recommended way to contour the ribs with the proper spherical radius of the mirror would be to notch the strips and assemble the stiffening rib lattice. The lattice would be supported for contouring by holding the opposite edges of the ribs in a slotted baseplate. The slots would be ¼"-⅜" deep for ribs 1" wide and ribs would fit them well. They would be held in place with wax. No additional support would be needed. The required spherical contour would be generated using a very fine diamond wheel. Edges of the ribs will be sharp, and any chipping of the edges would be insignificant.

While what has been described constitutes the presently most preferred embodiment, it should be clear that the invention could be practiced differently. For example, although a titanium hydride metallizing process is preferred, other metallizing processes including those using zirconium hydride, tantalum hydride or columbian hydride could also be used if desired.

Also, the process could be used to join any desired component to the mirror faceplate. For example, as mentioned previously, flexure elements as used in active mirror systems could be joined using the present invention. Also, elements other than glass, for example, ceramic or metal, could also be joined to the faceplate using the present invention.

Because the invention may take many forms, it should be understood that it is to be restricted only insofar as is required by the scope of the following claims.

I claim:

1. A method for making lightweight mirrors comprising:
   a. providing a mirror means, said mirror means including a front reflective surface and a back surface,
   b. metallizing a precise pattern on the back surface of said mirror means, and
   c. soldering support structure to said mirror means at said metallized pattern.

2. A method as recited in claim 1 wherein said metallizing step and said soldering step are performed simultaneously.

3. A method as recited in claim 2 wherein said step of soldering said support structure to said mirror means comprise the step of soldering stiffening ribs to said mirror means.

4. A method as recited in claim 2 wherein said metallizing step comprise the step of metallizing said precise pattern on said back surface of said mirror means by a titanium hydride metallizing process.

5. A method for making glass lightweight mirror facesheets for active mirror systems comprising:
   a. providing a thin mirror member;
   b. metallizing a precise pattern on the back surface of said mirror member, and
   c. soldering stiffening ribs to said mirror member at said metallized pattern.

6. A method as recited in claim 5 wherein said stiffening ribs are constructed of the same material as said mirror member and wherein the mating surface of said stiffening ribs are also metallized.

7. A method as recited in claim 6 and further including the step of soldering flexure components to the back surface of said mirror at certain areas of said metallized pattern.

8. A method as recited in claim 6 wherein said metallizing step and said soldering step are performed simultaneously.

* * * * *